United States Patent
Thelen et al.

(10) Patent No.: US 6,487,534 B1
(45) Date of Patent: Nov. 26, 2002

(54) DISTRIBUTED CLIENT-SERVER SPEECH RECOGNITION SYSTEM

(75) Inventors: Eric Thelen, San Jose, CA (US); Stefan Besling, San Jose, CA (US)

(73) Assignees: U.S. Philips Corporation, New York, NY (US); Koninkijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/533,489

(22) Filed: Mar. 23, 2000

(30) Foreign Application Priority Data

Mar. 26, 1999 (EP) .......................................... 99200950
Oct. 12, 1999 (EP) .......................................... 99203343

(51) Int. Cl.[7] .............................................. G10L 15/00
(52) U.S. Cl. ...................................... 704/270; 704/275
(58) Field of Search ................................. 704/270, 275

(56) References Cited

U.S. PATENT DOCUMENTS

| | | | |
|---|---|---|---|
| 5,819,220 A | | 10/1998 | Sarukkai et al. ............ 704/243 |
| 6,067,516 A | * | 5/2000 | Levay et al. ................ 704/244 |
| 6,101,473 A | * | 8/2000 | Scott et al. ................. 704/275 |
| 6,223,157 B1 | * | 4/2001 | Fisher et al. ................ 704/250 |
| 6,308,158 B1 | * | 10/2001 | Kuhnen et al. ............. 704/275 |
| 6,327,363 B1 | * | 12/2001 | Henderson et al. ..... 379/265.01 |
| 6,327,568 B1 | * | 12/2001 | Joost .......................... 704/270 |

OTHER PUBLICATIONS

L. Rabiner, B–H Juang, "Fundamentals of Speech Recognition", Prentice Hall, 1993, pp. 434–454.

* cited by examiner

*Primary Examiner*—Susan McFadden
(74) *Attorney, Agent, or Firm*—Daniel J. Piotrowski

(57) ABSTRACT

A distributed speech recognition system includes at least one client station and a server station connected via a network, such as Internet. The client station includes means for receiving the speech input signal from a user. A speech controller directs at least part of the speech input signal to a local speech recognizer. The, preferably limited, speech recognizer is capable of recognizing at least part of the speech input, for instance a spoken command for starting full recognition. In dependence on the outcome of the recognition, the speech controller selectively directs a part of the speech input signal via the network to the server station. The server station includes means for receiving the speech equivalent signal from the network and a large/huge vocabulary speech recognizer for recognizing the received speech equivalent signal.

12 Claims, 4 Drawing Sheets

DISTRIBUTED CLIENT-SERVER SPEECH RECOGNITION SYSTEM

The invention relates to a distributed speech recognition system for recognizing a speech input signal; the system including at least one client station and a server station; the client station including means for receiving the speech input signal from a user and means for transferring a signal representative of the received speech to the server station via a network; and the server station including means for receiving the speech equivalent signal from the network and a large/huge vocabulary speech recognizer for recognizing the received speech equivalent signal.

The invention also relates to a method of recognizing a speech input signal in a distributed system including at least one client station and a server station.

The invention further relates to a speech recognition client station.

The invention also relates to a method of handling a speech input signal in a client station of a distributed speech recognition system which further includes a server station. The invention also relates a computer program product where the program is operative to cause the computer to perform the method of handling the speech input signal.

U.S. Pat. No. 5,819,220 discloses a client-server speech recognition system, wherein the client station is local to the user and the server is located remotely, accessible via the public Internet. This system is used for providing speech input relating to a Web page. The user provides speech input to the client station which displays a Web page using a conventional browser. The speech may, for instance, be used for specifying a query or for filling information fields (e.g. name, and address) of the page. Usually, the client station receives the speech via a microphone and an A/D converter of an audio card. A representation of the speech is sent to a speech server on the Internet. This server may be located in or be accessible via a Web server that supplied the Web page. The server may also be accessible via the network at a location independent of the Web server. The server recognizes the speech. The recognition output (e.g. a recognized word sequence) may be sent back to the client station or directly to the Web server. In the known system a powerful speech recognizer can be used in the server which is capable of and optimized for recognizing speech in an Internet environment. For certain applications it will be required that this recognizer can support, to a certain extent, the huge vocabularies which can occur in an Internet environment where a user can access virtually any document on any topic. In the known client-server system the client station has no speech recognizer.

Since in the described system all speech input is directed to the server, the load on the server can get very high. This is particularly the case if the system supports many client stations operating at the same time.

It is an object of the invention to improve the system, client station and methods set forth by reducing the load on the server.

To achieve the object according to the invention, the system is characterized in that the client station includes a local speech recognizer and a speech controller; the speech controller being operative to direct at least part of the speech input signal to the local speech recognizer and, in dependence on the outcome of the recognition, selectively directing a part of the speech input signal via the network to the server station. By incorporating also a recognizer in the client station, load can be removed from the server. The server can be targeted towards the difficult task of providing high quality recognition of huge vocabulary speech for possibly many simultaneous users and be relieved from simple tasks which the local recognizer can easily fulfill. Although the tasks may be simple, they can remove a high load from the server and the network, simply by making it unnecessary to send all speech input to the server. Moreover, certain recognition tasks can be performed more effectively in the client than in the server, since the client can have easier access to local information relevant for the recognition.

As defined in the measure of the dependent claim 2, a simple recognizer is used in the client station. In this way the additional costs and processing load on the client station can be kept low.

As defined in the measure of the dependent claim 3, the local recognizer is used to detect a spoken activation command. This relieves the central recognizer from continuously having to scan the speech input signals coming from the client stations even if the user is not speaking or if the user is speaking but does not want his/her speech to be recognized. It also relieves the network from unnecessary load.

As defined in the measure of the dependent claim 4, the local recognizer is used for performing recognition of instructions for control of the local client station. The client station is best suited to determine which local operations are possible (e.g. which menu items can be controlled via voice). Moreover, it is avoided that the speech is sent via the network, and the recognition result is sent back, whereas the local station is equally well or even better suited for performing the recognition task.

As defined in the measure of the dependent claim 5, the client station uses its local recognizer to determine to which speech server the speech signal needs to be sent. Such an approach can efficiently be used in situations where there are several speech recognition servers. An example of this is a Web page with contains several advertisement banners of different companies. Some or all of these companies may have their own speech recognition server, for instance to allow a user to phrase spoken queries. The local recognizer/controller may perform the selection of the server and the routing of the speech based on spoken explicit routing commands, such as "select Philips", or "speak to Philips". Information used for recognizing the routing command may be extracted from the banner itself. Such information may be in the banner in the form of a tag, and may include items, such as a textual and phonetic representation of the routing command. The local recognizer/controller may also determine the routing based on information associated with the respective speech server. For instance, words of the banner text may be used as the basis for the routing. For instance, if the user speaks a word which occurs in one of the banners, the speech is directed to the speech server associated with that banner. If a word occurs in more than one banner, the speech may be routed to several speech servers, or to one server which was most likely (e.g. whose associated banner had the highest relative occurrence of the word). Instead of using the words which are explicitly shown in the banner, the banner may also be associated with textual information, e.g. via a link. If the used speaks one or more words from that information, the speech server for the banner is selected.

As defined in the measure of the dependent claim 6, the speech recognizer in the server is used as a kind of 'backup' for those situations in which the local recognizer is not capable of recognizing the user input adequately. The decision to transfer the speech input to the server may be based on performance indications like scores or confidence measures. In this way a conventional large vocabulary recognizer can be used in the client station, whereas a more powerful recognizer is used in the server. The recognizer in the server may, for instance, support a larger vocabulary or more specific language models. The local recognizer may remain operational and recognize the input, even if in parallel the input is also recognized by the server. In this way, the input of the user can still be recognized in 'real time'. The initial recognition of the local recognizer with a possibly lower accuracy can then be replaced by a possibly higher quality result of the server. A selector makes the final choice between the recognition result of the local recognizer and the remote recognizer. This selection may be based on the performance indicators.

To meet the object according to the invention, the method of recognizing a speech input signal in a distributed system includes:

receiving in the client station the speech input signal from a user;

recognizing at least part of the speech input signal in the client station;

selectively directing a signal representative of a part of the speech input signal via a network from the client station to the server station in dependence on the outcome of the recognition;

receiving the speech equivalent signal in the server station from the network; and recognizing the received speech equivalent signal in the server station using a large/huge vocabulary speech recognizer.

To meet the object according to the invention, the speech recognition client station includes:

means for receiving a speech input signal from a user means for recognizing at least part of the speech input signal;

means for selectively directing a signal representative of a part of the speech input signal via a network to a server station for recognition by a large/huge vocabulary speech recognizer in the server station; the directing being in dependence on the outcome of the recognition in the client station.

To meet the object of the invention, the method of handling a speech input signal in a client station of a distributed speech recognition system, which further includes a server station, includes:

receiving in the client station the speech input signal from a user;

recognizing at least part of the speech input signal in the client station;

selectively directing a signal representative of a part of the speech input signal via a network from the client station to the server station for recognition by a large/huge vocabulary speech recognizer in the server station; the directing being in dependence on the outcome of the recognition in the client station.

These and other aspects of the invention will be apparent from and elucidated with reference to the embodiments shown in the drawings.

Figure 1:
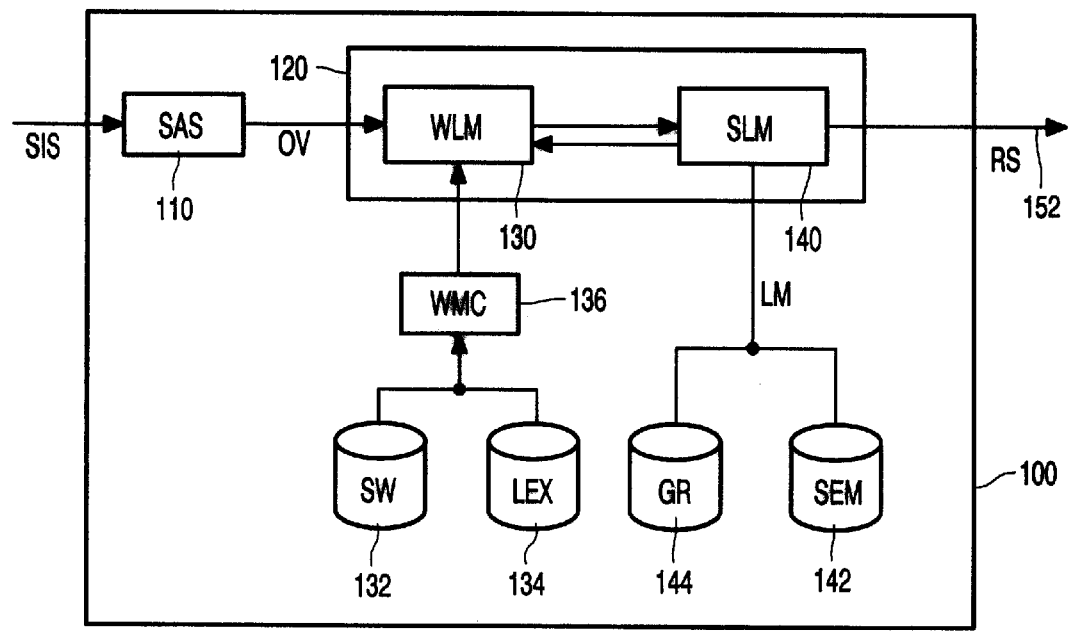
FIG. 1 shows the elements of a typical speech recognizer.

Speech recognition systems, such as large vocabulary continuous speech recognition systems, typically use a collection of recognition models to recognize an input pattern. For instance, an acoustic model and a vocabulary may be used to recognize words and a language model may be used to improve the basic recognition result. FIG. 1 illustrates a typical structure of a large vocabulary continuous speech recognition system 100 [refer L. Rabiner, B-H. Juang, "Fundamentals of speech recognition", Prentice Hall 1993, pages 434 to 454]. The system 100 comprises a spectral analysis subsystem 110 and a unit matching subsystem 120. In the spectral analysis subsystem 110 the speech input signal (SIS) is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. The standard approach to large vocabulary continuous speech recognition is to assume a probabilistic model of speech production, whereby a specified word sequence $W=w_1 w_2 w_3 \ldots W_q$ produces a sequence of acoustic observation vectors $Y=y_1 y_2 y_3 \ldots y_T$. The recognition error can be statistically minimized by determining the sequence of words $w_1 w_2 w_3 \ldots w_q$ which most probably caused the observed sequence of observation vectors $y_1 y_2 y_3 \ldots y_T$ (over time $t=1, \ldots, T$), where the observation vectors are the outcome of the spectral analysis subsystem 110. This results in determining the maximum a posteriori probability:

max $P(W|Y)$, for all possible word sequences $W$

By applying Bayes' theorem on conditional probabilities, $P(W|Y)$ is given by:

$P(W|Y)=P(Y|W).P(W)/P(Y)$

Since $P(Y)$ is independent of $W$, the most probable word sequence is given by:

arg max $P(Y|W).P(W)$ for all possible word sequences $W$ (1)

In the unit matching subsystem 120, an acoustic model provides the first term of equation (1). The acoustic model is used to estimate the probability $P(Y|W)$ of a sequence of observation vectors Y for a given word string W. For a large vocabulary system, this is usually performed by matching the observation vectors against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. In most small vocabulary speech recognition systems, a whole word is represented by a speech recognition unit, in which case a direct relationship exists between the word model and the speech recognition unit. In other small vocabulary systems, for instance used for recognizing a relatively large number of words (e.g. several hundreds), or in large vocabulary systems, use can be made of linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134.

Figure 2A:
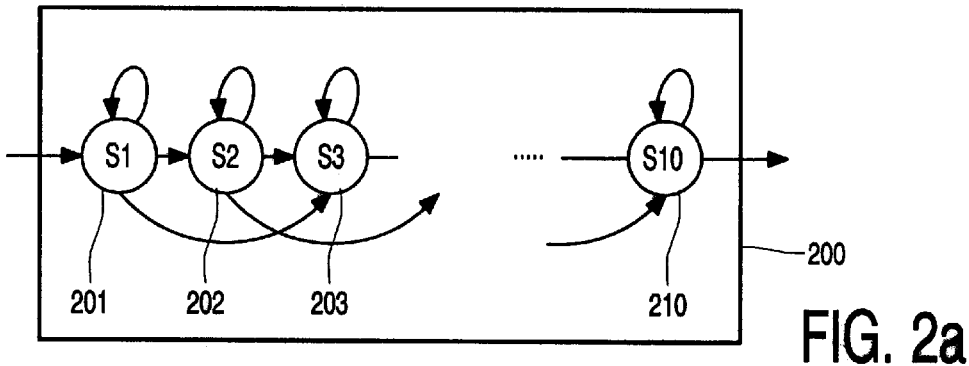
FIG. 2 illustrates HMM-based word models.
Figure 2B:
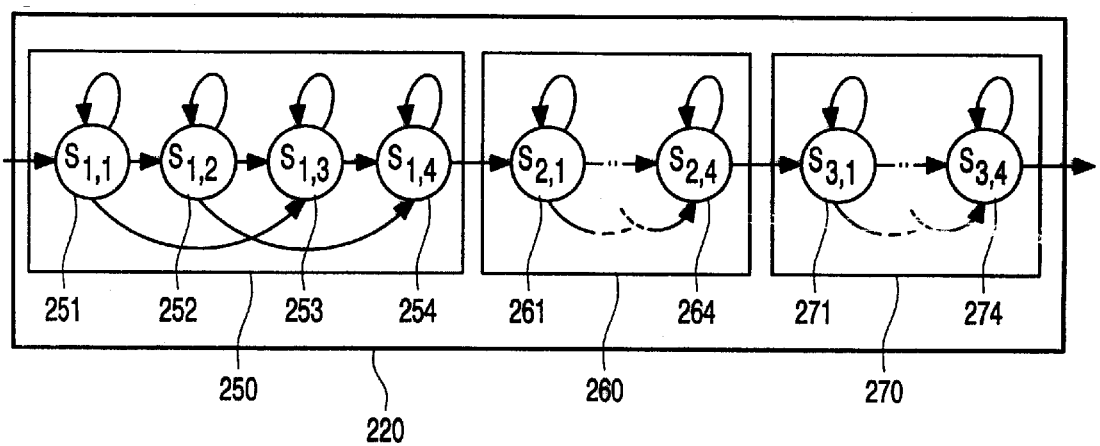

FIG. 2A illustrates a word model 200 for a system based on whole-word speech recognition units, where the speech recognition unit of the shown word is modeled using a sequence of ten acoustic references (201 to 210). FIG. 2B illustrates a word model 220 for a system based on sub-word units, where the shown word is modeled by a sequence of three sub-word models (250, 260 and 270), each with a sequence of four acoustic references (251, 252, 253, 254; 261 to 264; 271 to 274). The word models shown in FIG. 2 are based on Hidden Markov Models (HMMs), which are widely used to stochastically model speech signals. Using this model, each recognition unit (word model or subword model) is typically characterized by an HMM, whose parameters are estimated from a training set of data. For large vocabulary speech recognition systems usually a limited set of, for instance 40, sub-word units is used, since it would require a lot of training data to adequately train an HMM for larger units. An HMM state corresponds to an acoustic reference. Various techniques are known for modeling a reference, including discrete or continuous probability densities. Each sequence of acoustic references which relate to one specific utterance is also referred as an acoustic transcription of the utterance. It will be appreciated that if other recognition techniques than HMMs are used, details of the acoustic transcription will be different.

A word level matching system 130 of FIG. 1 matches the observation vectors against all sequences of speech recognition units and provides the likelihoods of a match between the vector and a sequence. If sub-word units are used, constraints can be placed on the matching by using the lexicon 134 to limit the possible sequence of sub-word units to sequences in the lexicon 134. This reduces the outcome to possible sequences of words.

Furthermore a sentence level matching system 140 may be used which, based on a language model (LM), places further constraints on the matching so that the paths investigated are those corresponding to word sequences which are proper sequences as specified by the language model. As such the language model provides the second term P(W) of equation (1). Combining the results of the acoustic model with those of the language model, results in an outcome of the unit matching subsystem 120 which is a recognized sentence (RS) 152. The language model used in pattern recognition may include syntactical and/or semantical constraints 142 of the language and the recognition task. A language model based on syntactical constraints is usually referred to as a grammar 144. The grammar 144 used by the language model provides the probability of a word sequence $W = w_1 w_2 w_3 \ldots w_q$, which in principle is given by:

$$P(W) = P(w_1) P(w_2|w_1) P(w_3|w_1 w_2) \ldots P(w_q|w_1 w_2 w_3 \ldots w_q).$$

Since in practice it is infeasible to reliably estimate the conditional word probabilities for all words and all sequence lengths in a given language, N-gram word models are widely used. In an N-gram model, the term $P(w_j|w_1 w_2 w_3 \ldots w_{j-1})$ is approximated by $P(W_j|w_{j-N+1} \ldots w_{j-1})$. In practice, bigrams or trigrams are used. In a trigram, the term $P(w_j|w_1 w_2 w_3 \ldots w_{j-1})$ is approximated by $P(w_j|w_{j-2} w_{j-1})$.

Figure 3:
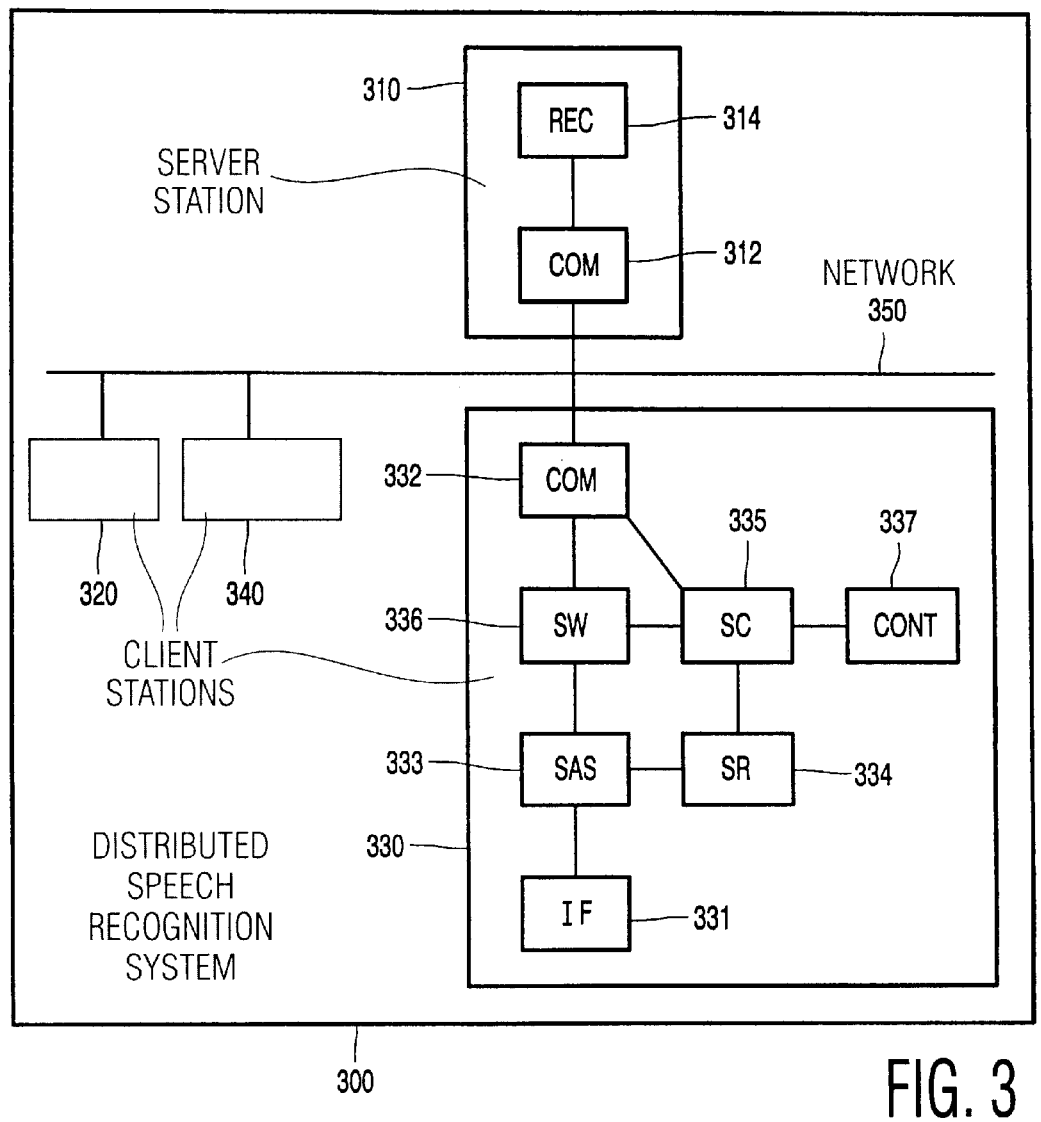
FIG. 3 shows a block diagram of a distributed speech recognition system according to the invention and FIG. 4 illustrates a system using the public Internet for access to the server station.

FIG. 3 shows a block diagram of a distributed speech recognition system 300 according to the invention. Examples of the working of the system will be described in particular for an application wherein recognized speech is converted to a textual or similar representation. Such a textual representation may be used for dictation purposes, where the textual representation is entered in a document, e.g. in word processor, or in a textual field, e.g. for specifying a field in a database. For dictation, current large vocabulary recognizers support an active vocabulary and lexicon of up to 60,000 words. It is difficult to obtain sufficient relevant data to build models capable of sufficiently accurate recognition for a much larger number of words. Typically, a user may add a certain number of words to the active vocabulary/lexicon. Those words can be retrieved from a background vocabulary of 300,000 to 500,000 words (which also contains an acoustic transcription of the words). For dictation or similar purposes a huge vocabulary may, for instance, consist of at least 100,000 active words or even over 300,000 active words. It will appreciated that particularly for an Internet environment where by a click on a link an entirely different context may be created it is preferred that many of the words of the background vocabulary can be actively recognized. For other recognition tasks, such as recognizing names, which are usually modeled as a flat list with some form of prior name probability attached to it, but for which no high quality language model exists, a vocabulary of over 50,000 words can already be classified as huge.

It will be understood that the recognition outcome need not be used for dictation purposes. It may equally well be used as input for other systems, such as dialogue systems, wherein depending on the recognized speech information is retrieved from a database or an operation is effected, like ordering a book or reserving a journey.

The distributed recognition system 300 comprises a server station 310 and at least one client station. Shown are three client stations 320, 330 and 340, where further details are only shown for client station 330. The stations may be implemented using conventional computer technology. For instance, the client station 330 may be formed by a desk-top personal computer or workstation, whereas the server station 310 may be formed by a PC server or workstation server. The computers are operated under control of a suitable program loaded in the processor of the computer. The server station 310 and the client stations 320, 330, and 340 are connected via a network 350. The network 350 may be any suitable network, such as a local area network, for instance in an office environment, or a wide area network.

Figure 4:
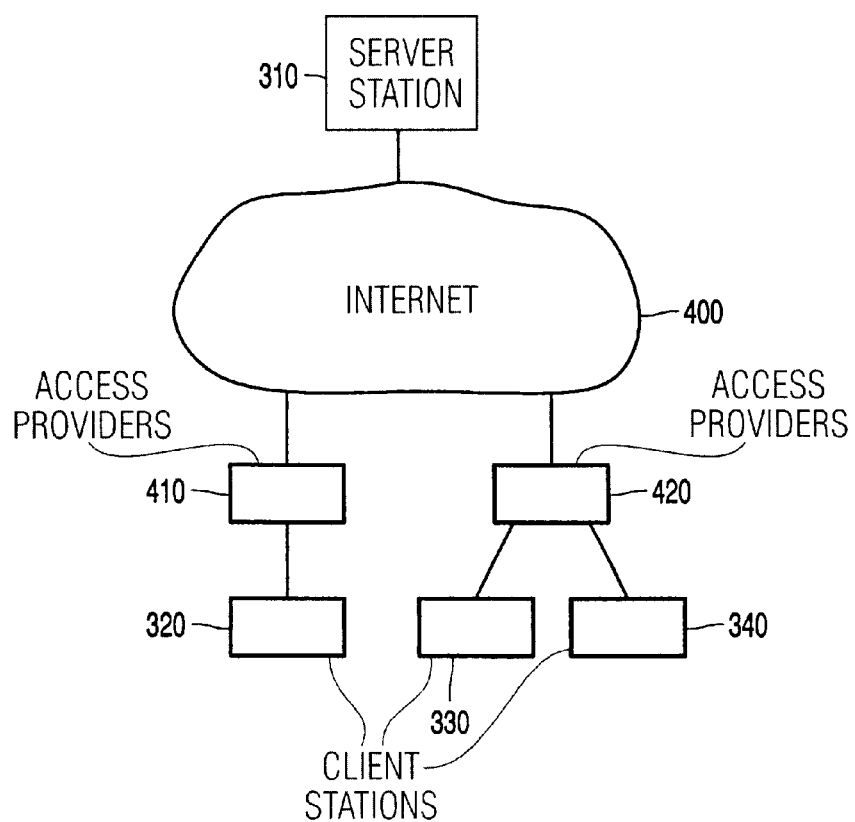

FIG. 4 illustrates a preferred embodiment of the system wherein the wide area network is the public Internet 400. In this case, the server station 310 can be seen as a service provider which provides a service to users (client stations) via the public Internet. The service offered by the service provider may be restricted to speech-to-text conversion (receiving the speech via the public Internet and returning the recognition outcome in a textual or similar form). The service provider may also offer enhanced functionality, such as acting as a portal to various types of information available in the public Internet. Such enhanced functionality may be use the speech recognized by the server station, in which case the recognized speech need not be returned to the client station. The client stations get access to the public Internet 400 via access providers. Shown are two access providers 410 and 420. In the example, access provider 410 provides access to the client station 320, whereas the access provider 420 provides access to the client stations 330 and 340. The connection between the access provider and its client station (s) usually also occurs via a wide area network, like a dial-in telephone connection or a TV cable connection.

Figure 5:
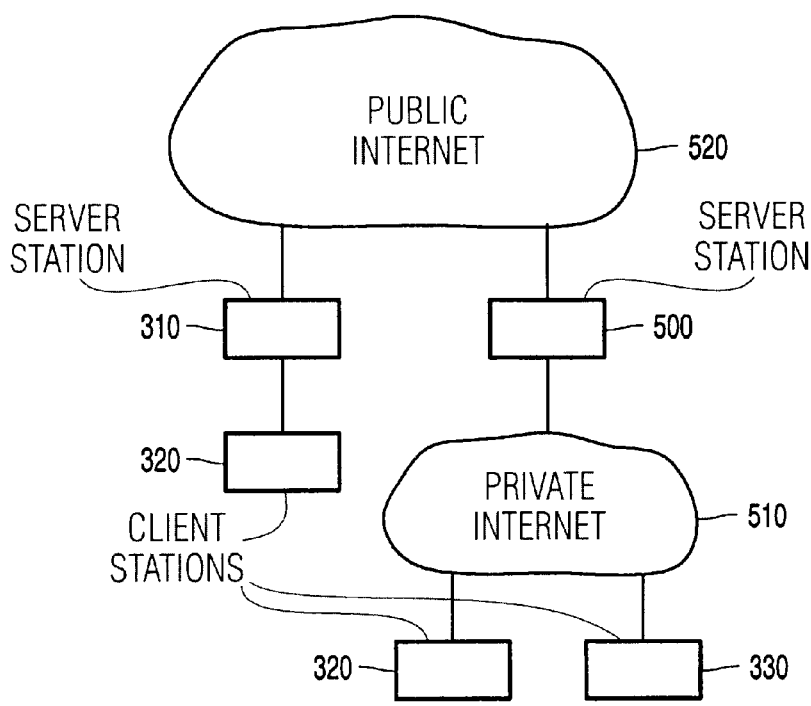
FIG. 5 illustrates a system with private access to the server station.

FIG. 5 illustrates another preferred embodiment of the system, wherein instead of the server station being accessible by the client stations via the public Internet, the server station is accessible via a 'private' network. With private is meant that access is limited to certain client stations, typically those who have subscribed to a service. In itself such a private network may use a public facility, like a telephone network, where access is restricted to client stations associated with the server station. Such a private network may be a wide area network and may also use the IP protocol. In the example, the client station 320 has a direct connection to the server station 310, for instance via a dial-in telephone connection. A second server station 500 is shown, which can be accessed by its client stations 320 and 330 via a private Internet 510. The server stations 310, 500, accessible via such private networks, may also provide their associated client stations access to part of or even the entire public Internet, shown as 520. Consequently, such a server station can perform the role of an access provider. A preferred embodiment of a server station accessible via a private wide area network is a Web TV server, where the Web TV set top boxes or Web TVs act as the client stations. As such the Web TV server may provide the speech recognition functionality of the server station 310. Similarly as described for access via the public Internet, the Web TV server may use the outcome of the recognition for performing tasks for the client station, like obtaining certain information. As such the recognized speech need not be returned to the client station. It should be noted that with a wide area network any network is meant which offers communication outside a building. As such a wide area network also covers communication via a TV cable network.

As illustrated in FIG. 3, the stations comprise communication means 312 and 332, respectively, for communicating via the network 350. Any communication means suitable for use in combination with the network 350 may be used. Typically, the communication means are formed by a combination of hardware, such as a communication interface or a modem, and software in the form of a software driver supporting a specific communication protocol, such as Internet's TCP/IP protocols. The client station 330 comprises means for receiving speech from a user, for instance via an interface 331. The client station 330 further comprises means for pre-processing the speech signal, making it suitable for transfer to the server station 310. For instance, the client station may comprise a spectral analysis subsystem 333 similar to the spectral analysis subsystem 110 of FIG. 1. The server station 310 is capable of performing all other tasks as described for system 100 of FIG. 1. Preferably, the server station is capable of large or huge vocabulary continuous speech recognition. In itself large vocabulary speech recognition is well-known. For huge vocabulary speech recognition preferably the technique described in the co-pending application PHD 99039 of the same applicant is used. The server station 310 comprises a recognizer 312 which may be similar to the unit matching subsystem of FIG. 1, using a word model and a language model. The recognition output, such as a sequence of recognized words RS, may be transmitted back to the client station 330. It may also be used in the server station 310 for further processing (e.g. in a dialogue system), or be transferred to a further station, like a service provider on Internet. According to the invention, the client station 330 includes a speech recognizer 334. In a preferred embodiment, the speech recognizer 334 of the client station 3 is a limited speech recognizer, such as a small vocabulary or keyword recognizer. Such recognizers are well-known and can be implemented cost-effectively. The client station 330 further includes a speech controller 335. The speech controller 335 analyzes the outcome of the recognition by the local recognizer 334 and, in dependence on the outcome of the recognition, selectively directs a part of the speech input signal via the network 350 to the server station 310. To this end, the client station 330 includes a controllable switch 336 which determines whether or not the speech input received via the interface 331 (and analyzed by the analyzer 333) is sent by means of the communication interface 332 to the server station 310. Depending on the task of the local recognizer 334 and the load which may be put on the client station 330, the speech controller 335 may use a further switch to only transfer part of the speech input signal to the local speech recognizer 334. For instance, the client station 330 may include a speech activity detector which, for instance based on the energy level of the received input signal, determines whether or not the user might be speaking. If the user is not speaking (the level is below a threshold), the signal need not be directed to the local recognizer 334. Such activity detectors are known. If the load is not a limiting factor, it is preferred to always direct the speech to the local recognizer, at least when the user has activated the involved programs and as such has indicated a wish to sometime start a recognition session. By always having the local recognizer active, defects of the energy-based activity detectors can be avoided. For instance, it is very difficult to achieve an accurate setting of a threshold for such a detector, particularly in a noisy environment, e.g. with background music or people speaking in the background.

In a preferred embodiment, the speech recognizer 334 is a limited speech recognizer operative to recognize a spoken command for activating recognition by the server station. If such a predetermined command (or one of a number of predetermined activation commands) has been recognized, the speech controller 335 controls the switch 336 to direct the speech input signal to the server station 310. The speech controller 335 also sends an activation instruction to the server station 310 via the communication means 332. This activation instruction may be implicit. For instance, recognition in the server 310 may automatically be activated whenever speech is received via the communication interface 312.

In an alternative embodiment, the recognizer 334 is operative to recognize at least one spoken command/control instruction relating to the operation of the local client station 330. For this task it is sufficient to use a small vocabulary or keyword recognizer. In response to recognizing a local command/control instruction, the speech controller 335 issues a corresponding machine control instruction to a station controller 337 of the local client station 330. Such a machine instruction may be an operating system or user interface instruction as, for instance, defined for the Windows operating system. The speech controller 335 as well as the station controller 337 may be tasks under Windows.

Figure 6:
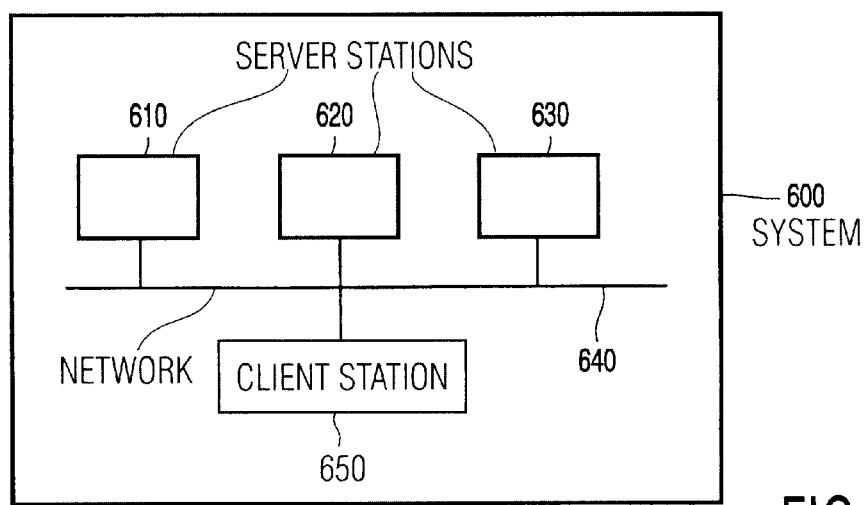
FIG. 6 shows a block diagram of a system with a choice of server stations.

In an alternative embodiment, as shown in FIG. 6, the system 600 includes a plurality of server stations, shown are 610, 620 and 630. The server stations may be of similar construction as described for server station 310 of FIG. 3. The server stations are connected via a network 640 to at least one client station, shown is client station 650. The client station 650 may be of a same construction as described for station 330 of FIG. 3. The speech recognizer of the client station 650 is, preferably, a limited speech recognizer. The speech recognizer is operative to recognize speech routing commands. The speech controller of the client station selectively directs the speech input signal to at least one server associated with the recognized routing command. The directing may be based on a table for translating a speech routing command to a network address of a server station. Such a table may be predetermined, e.g. once loaded into the client station or entered by the user of the client station. Alternatively, such a table may be dynamic. For instance, the table may be embedded in or associated with a document, such an HTML document, downloaded via Internet. In such a document, different areas may be associated with different respective servers. For instance, a document may included several advertisement banners, each associated with its own recognition server.

In an alternative embodiment, the speech recognizer 334 of the client station 330 of FIG. 3 is a large vocabulary speech recognizer (or optionally a huge vocabulary speech recognizer). The speech controller 335 directs part (or all) of the speech input signal to the server station 310 if a performance indicator for a recognition result of the speech recognizer 334 in the local client station 330 is below a predetermined threshold. The directing may be effected by changing the switch 336. In principle it may be sufficient to only route the last part of the speech signal to the server station 310, e.g. only the part relating to a badly recognized sentence. It may be preferred to route also earlier speech material to the server station 310, allowing the server station to better synchronize with the speech signal and, optionally, choose suitable recognition models, such as acoustic or language models based on the earlier part of the signal. The server station 310 transfers a recognized word sequence back to the client station 330. The client station 330 including a selector for selecting a recognized word sequence from the word sequences respectively recognized by the recognizer in the client station and recognizer in the server station. In practice the task of the selector will be combined with the task of the speech controller 335, which anyhow already analyzes the results of the local recognition.

Figure 7:
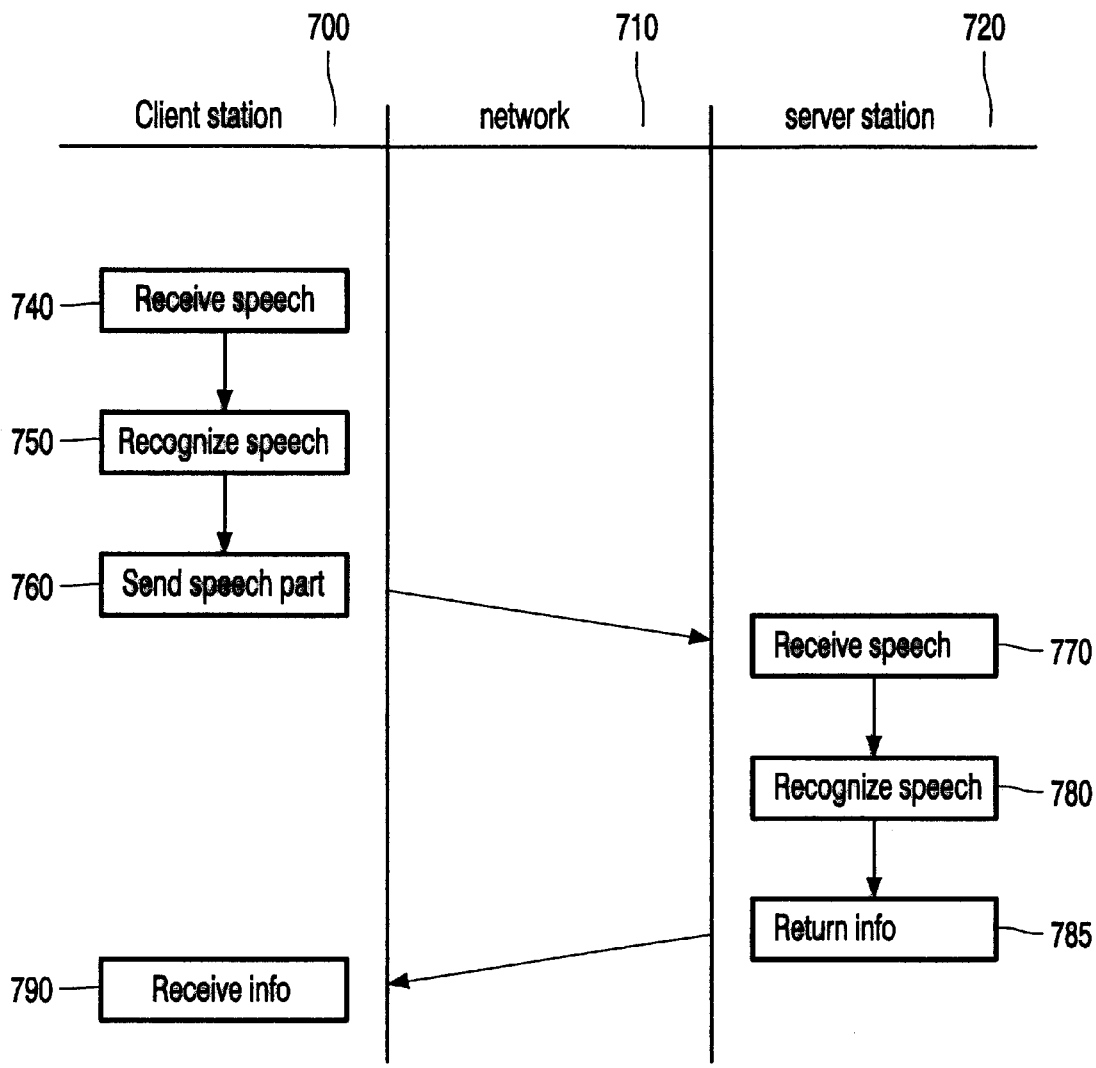
FIG. 7 illustrates the method of recognizing a speech input signal in a distributed system.

FIG. 7 illustrates the method of recognizing a speech input signal in a distributed system including at least one client station 700 and a server station 720 able to communicate via a network 710. The method includes step 740 of receiving in the client station 700 the speech input signal from a user. In step 750 at least part of the speech input signal is recognized in the client station 700. In step 760 a signal representative of a part of the speech input signal is selectively directed via the network 710 from the client station 700 to the server station 720. The directing depends on the outcome of the recognition in the client station 700. In step 770, the speech equivalent signal is received in the server station 720 from the network 710. In step 780 the received speech equivalent signal is recognized in the server station 720 using a large/huge vocabulary speech recognizer. Optionally in step 785, the server station returns information representative of a recognition outcome (e.g. a textual transcription of the recognized speech) of the recognition of the speech representative signal back to the client station 700 via the network 710. In step 790, the client station receives the information.

Normally the client station is implemented on a conventional computer, such as a PC or workstation. Increasingly, also portable equipment, such as PDAs, laptops or even telephones, are equipped with speech recognition. The functionality described by the invention is typically executed using the processor of the device, using conventional hardware, such as an audio card, for converting an analogue microphone signal into a digital data stream. If required also optimized hardware, such as DSPs, may be used for performing the speech recognition. The processor, such as a PC-type processor, micro-controller or DSP-like processor, can be loaded with a program to perform the steps according to the invention. The program is usually loaded from a background storage, such as a harddisk or ROM. A computer program product can be used, for instance, to initially store the program in the background storage. Such a product may be stored on a storage medium, like a CD-ROM, or may be distributed via a network, like the public Internet.

What is claimed is:

1. A distributed speech recognition system for recognizing a speech input signal, the system comprising:
   at least one client station and a server station;
   the client station including a processor configured to transmit a signal representative of the received speech input signal to the server station; and
   the server station including a vocabulary speech recognizer for recognizing the received speech equivalent signal;
   wherein the client station includes a local speech recognizer and a speech controller; the speech controller being operative to direct at least part of the speech input signal to the local speech recognizer and, and
   wherein, respective portions of the speech recogntion of the speech input signal are processed by the client station and server station, independently.

2. The system as claimed in claim 1, wherein the local speech recognizer of the client station is a limited speech recognizer, such as a small vocabulary or keyword recognizer.

3. The system as claimed in claim 1, wherein the local speech recognizer is operative to recognize a spoken command for activating recognition by the server station; and wherein the speech controller is operative to send, in response to recognizing an activation command, an activation instruction to the server and to direct the speech input signal to the server station.

4. The system as claimed in claim 1, wherein the recognizer is operative to recognize at least one spoken command/control instruction relating to the operation of the local client station and the speech controller is operative to issue a machine control instruction corresponding to the recognized command/control instruction to a station controller of the local client station.

5. The system as claimed in claim 1, characterized in that the system includes a plurality of server stations; the speech recognizer being operative to recognize speech routing commands; the speech controller being operative to selectively direct the speech input signal to at least one associated server.

6. The system as claimed in claim 1, wherein the speech recognizer of the client station is a large vocabulary speech recognizer; the speech controller being operative to direct at least a part of the speech input signal to the server station if a performance indicator for a recognition result of the speech recognizer in the local client station is below a predetermined threshold;
   the server station being operative to transfer a recognized word sequence back to the client station;
   the client station including a selector for selecting a recognized word sequence from the word sequences respectively recognized by the recognizer in the client station and recognizer in the server station.

7. A method of recognizing a speech input signal in a distributed system including at least one client station and a server station; the method including:

receiving in the client station the speech input signal from a user;

recognizing at least part of the speech input signal in the client station;

selectively directing portions of a signal representative of a part of the speech input signal from the client station to the server station; receiving the speech equivalent signal in the server station; and recognizing the received speech equivalent signal in the server station using a speech recognizer.

8. A speech recognition client station as claimed in claim 7, wherein the station includes means for receiving from the server station information representative of a recognition outcome of the recognition in the server station of the speech representative signal sent to the server station.

9. A speech recognition client station including:

means for receiving a speech input signal from a user means for recognizing at least part of the speech input signal;

means for selectively directing a signal representative of a part of the speech input signal to a server station for recognition by a speech recognizer in the server station; wherein, respective portions of the speech recogntion of the speech input signal are processed by the client station and server station, independently.

10. A method of handling a speech input signal in a client station of a distributed speech recognition system which further includes a server station; the method including:

receiving in the client station the speech input signal from a user;

recognizing at least part of the speech input signal in the client station;

selectively directing a signal representative of a part of the speech input signal from the client station to the server station for recognition by a large/huge vocabulary speech recognizer in the server station; wherein, respective portions of the speech recogntion of the speech input signal are processed by the client station and server station, independently and the directing being in dependence on the outcome of the recognition in the client station.

11. A method as claimed in claim 10, wherein the method includes receiving in the client station information from the server station representative of a recognition outcome of the recognition in the server station of the speech representative signal sent to the server station.

12. A computer program product where the program is operative to cause the computer to perform the method of claim 11.

* * * * *